United States Patent [19]
Vitthal et al.

[11] Patent Number: 5,558,161
[45] Date of Patent: Sep. 24, 1996

[54] METHOD FOR CONTROLLING FLUID-LOSS AND FRACTURING HIGH PERMEABILITY SUBTERRANEAN FORMATIONS

[75] Inventors: Sanjay M. Vitthal, Duncan, Okla.; Mary A. Hardy, Leiderdorp, Netherlands; David E. McMechan, Duncan, Okla.; William E. Martch, Shekou, China; Ronald G. Dusterhoft, Calgary, Canada

[73] Assignee: Halliburton Company, Duncan, Okla.

[21] Appl. No.: 397,468

[22] Filed: Feb. 2, 1995

[51] Int. Cl.$^6$ .................................................. E21B 43/267
[52] U.S. Cl. ........................ 166/280; 166/300; 166/308
[58] Field of Search .................................. 166/280, 281, 166/300, 308

[56] References Cited

U.S. PATENT DOCUMENTS

| | | | |
|---|---|---|---|
| 3,121,464 | 2/1964 | Huitt et al. | 166/280 |
| 3,335,797 | 8/1967 | Braunlich, Jr. | 166/280 |
| 3,349,851 | 10/1967 | Huitt et al. | 166/280 |
| 3,888,312 | 6/1975 | Tiner et al. | 166/308 |
| 4,021,355 | 5/1977 | Holtmyer et al. | 166/308 X |
| 4,502,967 | 3/1985 | Conway | 166/308 X |
| 4,518,040 | 5/1985 | Middleton | 166/308 X |
| 4,619,776 | 10/1986 | Mondshine | 166/308 X |
| 4,779,680 | 10/1988 | Sydansk | 166/300 |
| 4,960,527 | 10/1990 | Penny | 166/300 |
| 5,159,979 | 11/1992 | Jennings, Jr. | 166/280 |
| 5,165,479 | 11/1992 | Harris et al. | 166/300 |
| 5,271,466 | 12/1993 | Harms | 166/300 |
| 5,304,620 | 4/1994 | Holtmyer et al. | 166/308 X |
| 5,325,921 | 7/1994 | Johnson et al. | 166/280 |

*Primary Examiner*—George A. Suchfield
*Attorney, Agent, or Firm*—Robert A. Kent

[57] ABSTRACT

A method of fracturing high permeability formations is provided utilizing a first crosslinked gel fluid to initiate the fracture followed by a second gel which results in improved proppant transport and packing of the fracture.

18 Claims, 1 Drawing Sheet

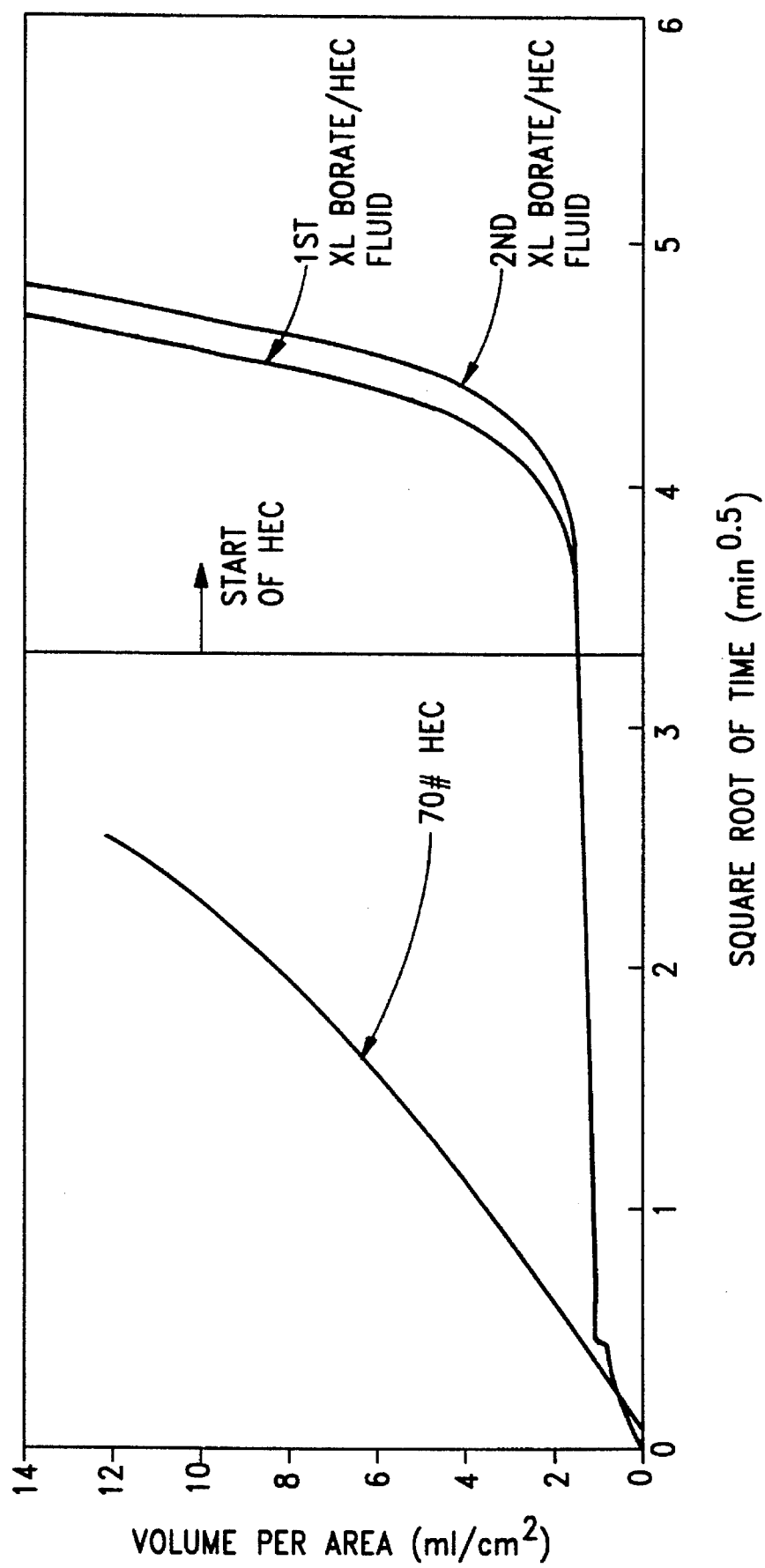

METHOD FOR CONTROLLING FLUID-LOSS AND FRACTURING HIGH PERMEABILITY SUBTERRANEAN FORMATIONS

BACKGROUND OF THE INVENTION

1. Field of the Invention

This invention relates to the art of producing hydrocarbons from a subterranean formation and more particularly, to a process for fracturing a high permeability subterranean formation and controlling fluid-loss which results in higher regained formation permeability upon completion of the process.

2. Brief Description of the Prior Art

In the fracturing of subterranean formations for the production of hydrocarbons, it is common to produce fractures in the formation by pumping a fluid at a relatively high pressure into the formation through a wellbore whereby the formation fracturing pressure gradient is exceeded and fractures propagate from the wellbore into the formation. Nearly any fluid given enough volume and pressure can be used to fracture a subterranean formation. However, fracturing fluids, generally include a viscosifying or gelling agent such as a polysaccharide material, such as for example, a natural or synthetic gum such as guar or hydroxypropyl guar or a derivatized cellulose such as hydroxyethylcellulose to affect the rheology and increase the proppant carrying capability of the fluid. These fluids are often referred to as "linear gels." Additionally, the fluid-loss control and proppant transport capability can be effected by the use of crosslinking additives incorporated into the fracturing fluid. Some well known crosslinking agents include borates, titanates, zirconates, antimony and other organometallic compounds such as described in U.S. Pat. Nos. 3,888,312, 4,021,355, 4,502,967, 5,165,479, 5,271,466 and 5,304,620.

Each of the crosslinked fracturing fluids has its own particular advantages. Borate crosslinked systems generally are considered to be less damaging to fracture conductivity because the gels generally can be broken more efficiently and removed from the formation. Borate fluids, however, generally are usable only at lower temperatures (below about 300° F.) because of thermal breakdown during use. Titanium and zirconium crosslinked fluids generally exhibit better temperature stability, but generally are believed to be more damaging to the formation if incomplete breaking of the gel occurs.

Stimulation in high-permeability formations, that is formations having a permeability greater than 10 millidarcy (>10 md), has generated considerable interest in recent years. Attempts have been made to utilize hydroxyethylcellulose (HEC) as a viscosifier in the fracturing fluids. Unfortunately, HEC and most other linear gels exhibit high rates of leak off to the formation because they may not build up a satisfactory filter cake with acceptable volumes of lost fluid at permeabilities >10 md. This results in large volumes of fluid being required for each formation treatment. The high fluid-loss also makes it very difficult to create a fracture having the desired geometry to maximize hydrocarbon production.

Because of their ability to build filter cakes, even in high permeability formations, crosslinked fracturing fluids demonstrate better fluid-loss control. However, these filter cakes can be more damaging to the formation production capability than linear gels through damage to the proppant bed permeability and by invasion into the formation.

It would be desirable to provide a method by which a high permeability formation could be successfully stimulated while minimizing the potential for formation and proppant bed damage.

SUMMARY OF THE INVENTION

The present invention provides a method whereby a relatively high permeability subterranean formation (above about 10 md) may be fractured by a fracturing fluid system which results in significantly less formation damage than general crosslinked gel systems and high proppant pack conductivity. In accordance with the invention, an aqueous fracturing fluid is prepared including a viscosifying agent. In a preferred embodiment, the aqueous fracturing fluid comprises a borate crosslinked hydroxypropyl guar gel. The crosslinked gel is introduced into a subterranean formation through a wellbore at a rate and pressure sufficient to result in initiation of a fracture in the formation and development of a filter cake to control fluid-loss. The first fluid also may include a quantity of proppant. A second fracturing fluid also is prepared. The second fluid comprises a viscosifying agent and may or may not include a crosslinking agent for the viscosifying agent. In a preferred embodiment the second fluid does not include a crosslinking agent. A proppant is added to the second gel and the fluid is introduced into the formation and into the fracture created by the first fluid. The second fluid functions to carry and transport the proppant into the created fracture and, more importantly, to induce a break of the filter cake formed from the first fluid. The second fluid causes an increase in the leak-off rate of the fluid through the fracture faces which improves the ability of the proppant to pack within the fracture by dehydration of the fracturing fluid. The increased leak-off rate may result from breaking the crosslinked fluid, such as by altering the fluid pH, increased breaker concentration in the gel or by physical erosion of the filter cake by the second fluid.

BRIEF DESCRIPTION OF THE DRAWINGS

The drawing FIGURE provides a graphical illustration of the leak-off of fluids used in the method of the present invention in comparison to a hydroxyethyl cellulose gel.

DETAILED DESCRIPTION OF THE PREFERRED EMBODIMENTS

As used in this specification and claims, a subterranean formation having a high permeability is a formation that has a permeability of at least 10 millidarcy (10 md) as determined by core sample analysis or field production or well testing.

In accordance with the method of the present invention, a first crosslinked gel is prepared by admixing a viscosifying agent or gelling agent with an aqueous fluid and then a crosslinking agent. The aqueous liquid can comprise substantially any aqueous liquid that does not adversely react with the components of the crosslinked gel fluid. The aqueous fluid can comprise, for example, fresh water or brine solutions. The aqueous fluid also may include pH control agents such as buffers or the like to adjust or maintain the pH of the fluid within a particular range to facilitate formation of the gel.

The gelling agent can be any of a variety of hydratable natural or synthetic polymeric materials. Preferably, the gelling agent is a natural material such as guar gum, derivatized guar gum or derivatized cellulose. The polysaccharide polymers may comprise, for example, hydroxyethylguar, hydroxypropylguar, carboxymethyl hydroxypropylguar, carboxymethylguar, carboxymethylhydroxyethylguar, hydroxyethylcellulose, carboxymethylhydroxyethylcellulose, vinyl phosphonic acid grafted hydroxyethylcellulose carboxymethylhydroxypropylcellulose and the like. The gelling agent can be admixed with the aqueous fluid in an amount of from about 10 to about 100 pounds per 1000 gallons of aqueous fluid.

Crosslinking compounds which are useful in accordance with this invention are antimony III, chromium III, titanium IV or zirconium IV containing compounds or a source of borate. Examples of compounds which supply the above ions are zirconium lactate, zirconium carbonate, potassium pyroantimonate, titanium acetylacetonate, titanium triethanolamine, chromium III citrate and the like. The borate crosslinking agent may be any material which supplies borate ions in an aqueous solution. The borate source may be a rapidly soluble source such as boric acid, borax or "POLYBOR" agent manufactured by U.S. Borax. The borate source may also be a slowly soluble borate such as alkaline earth metal borate, alkali metal alkaline earth metal borates and mixtures thereof such as disclosed in U.S. Pat. No. 4,619,776 the entire disclosure of which is incorporated herein by reference.

In a preferred embodiment the gelling agent is guar gum, hydroxypropyl guar or carboxymethylhydroxypropylguar and the crosslinking agent is a soluble source of borate ions.

The presence of nitrogen gas in the crosslinking gel fluid does not appreciably change its characteristics. Carbon dioxide may be used with many of the fluids, however, it may effect the fluid characteristics in fluids such as crosslinked borate gels. With nitrogen or carbon dioxide included, the crosslinking gel fluid is particularly suitable for use in carrying out subterranean formation fracturing procedures, both wherein the carbon dioxide or nitrogen are commingled with the gel fluid and where it is foamed therewith. A commingled fluid generally contains carbon dioxide or nitrogen in an amount of from about 5% to about 50% by volume of the fluid, and a foam contains higher concentrations of nitrogen or carbon dioxide as the internal phase, i.e., up to in excess of 96% by volume of the fluid.

The resulting gel is pumped into the wellbore and into the subterranean formation at a rate and pressure sufficient to fracture the subterranean formation. In general the crosslinking agent is selected such that the crosslinked gel viscosity achieves a maximum upon entry into the subterranean formation. In some instances this delayed or retarded increase in viscosity is referred to as "delayed crosslinking." As used herein the term "crosslinking agent" is intended to include both agents which immediately begin to increase the viscosity of a gelled fluid by crosslinking and any agents which exhibit a delayed or retarded crosslinking of the gelled fluid whereby the final fluid viscosity exceeds the initial fluid viscosity as a result of subsequent activation of the crosslinking reaction by a change in temperature, pH or merely the passage of time.

The crosslinked gel rapidly forms a filter cake upon the face of the created fracture(s) and establishes fluid-loss control within the fracture(s) to permit extension of the fracture(s) through injection of additional fluid. After initiation and extension of the fracture(s) has occurred, a proppant is introduced into the created fracture(s) to create a conductive flow path to the wellbore upon termination of the treatment.

The proppant can comprise substantially any of the well known particulates that are suitable for usage, such as for example, sand, resin coated sand, particulate ceramics, glass microspheres, sintered bauxite, synthetic organic beads such as styrene-divinylbenzene copolymer beads and the like. The proppant can be admixed with the gelled fluid in an amount of from about ¼ to in excess of 30 pounds per gallon of gelled fluid. The proppant may be introduced into the fracture in the first gelled fluid, the second gelled fluid or both fluids.

A second gelled fluid is prepared by admixing an aqueous fluid and a gelling agent. The gelling agent may comprise substantially any of the previously described gelling agents. The aqueous fluid may comprise substantially any of the previously described aqueous fluids. The second gelled fluid also may include a crosslinking agent of the type previously identified however in the preferred embodiment of the invention, the second gelled fluid is a linear gel. The linear gel may be prepared with the same gelling agent in the same concentrations as used in the first fluid and preferably is the same gelling agent and is used at the same concentration.

The second gelled fluid is pumped into the wellbore after the first crosslinked gel to further extend the fracture(s) in the formation and to introduce additional proppant into the created fracture to pack the fracture with proppant. The second fluid functions to disrupt the integrity of the filter cake to cause a higher fluid leak-off and as the fluid dehydrates by passage into the formation, the proppant is compressed and packed into the fracture. The second gelled fluid can disrupt the filter cake in any of several ways or in multiple ways so long as the fluid leak-off is increased. The filter cake can be disrupted by the incorporation of higher concentrations of breakers in the second gel for the filter cake. The second fluid may have a pH which results in de-stabilization of the filter cake through breaking the crosslinking agent bond or attacking the gelling agent. The filter cake may be physically eroded by passage of the second gelled fluid through the fracture or by any other means that results in an increase in the fluid leak-off rate to the formation from the created fracture(s). Surprisingly, it has been found that the second gelled fluid can cause the substantially complete removal of the filter cake and the regained permeability of the formation is comparable to that of having used only a linear gel for the treatment however, the fluid efficiency may be several hundred percent greater than the fluid efficiency achieved through use of only a linear gel.

The foregoing effect may be more clearly understood by reference to the drawing figure which illustrates the fluid loss of a sample in a circulating flow loop of a 70# hydroxyethylcellulose in comparison to a 40# borate crosslinked hydroxypropyl guar followed by a 70# hydroxyethylcellulose using a core sample having a permeability of about 180 md, at a temperature of 180° F., at a pressure of 1000 psi and a shear rate of 50 sec$^{-1}$. The borate crosslinked gel readily builds a filter cake to establish fluid loss control. After a period of time the uncrosslinked gel which includes a breaker is introduced into the cell. The sharp increase in fluid loss that rapidly occurs indicates the dissolution and breaking up of the filter cake. The rate of fluid loss quickly becomes similar to the straight hydroxyethylcellulose gel which is characteristic of a hydroxyethylcellulose gel in a high permeability formation. The fluid loss test is repeated with a second core having a permeability of about 190 md. with similar results. Physical examination of the core samples upon completion of the fluid loss test show no filter cake on the surface of the core.

In a preferred embodiment of the present invention, the first crosslinked gelled fluid comprises a 30 to about 40 lb per 1000 gallon of fluid gel utilizing a hydroxypropylguar gelling agent and borate crosslinking agent. The second fluid preferably comprises a 30 to about 80 lb per 1000 gallon of fluid gel utilizing a hydroxypropylguar or hydroxyethylcellulose gelling agent. In this preferred embodiment the first fluid preferably has a pH in the range of from about 9 to about 11 and the second fluid has a pH in the range of from about 5 to about 7.5.

The first and second gelled fluids also can contain, in addition to pH control agents fluid loss control additives, clay stabilizers, surfactants, such as foaming agents, flow enhancers and the like, oxygen scavengers, alcohols, breakers and the like.

To further illustrate the present invention and not by way of limitation, the following examples are provided.

EXAMPLE

It was desired to simulate a multi-layer formation at a depth of from about 4700 to 4850 feet having a perforated interval of 49 feet and a reservoir temperature of about 140° F. The simulation is effected using "FRACPRO 6.2" software licensed from Resources Engineering Systems, Inc. The simulation is performed using (1) a linear 70# hydroxyethylcellulose gel in an amount of 100,000 gal., (2) a linear 70# hydroxyethylcellulose gel in an amount of 4,500 gal. and (3) a crosslinked borate gel using 30# hydroxypropyl guar in an amount of 4,500 gal. followed by a linear 70# hydroxyethylcellulose gel containing proppant in the volumes and ramped in the quantities indicated in the following Table I.

TABLE I

| Stage | Fluid Volume Gallons | Proppant Concentration pound/gallon |
|---|---|---|
| Pad | Varied | 0 |
| 1 | 1000 | 2 |
| 2 | 1000 | 4 |
| 3 | 1000 | 8 |
| 4 | 1500 | 10 |
| 5 | 1500 | 12 |

The results of the simulation are as follows in Table II for each fluid system:

TABLE II

| Fluid System | Propped Fracture Length, Ft. | Average Proppant Concentration, lb/ft² | Total Proppant, lb | Fluid Efficiency % |
|---|---|---|---|---|
| 1 | 48 | 2.25 | 15500 | 0.0 |
| 2 | 22 | 5.86 | 5860 | 2.0 |
| 3 | 58 | 6.15 | 52200 | 12.0 |

The simulation clearly demonstrates the high pack density and improved efficiency obtained through use of the present invention.

EXAMPLE II

A Treatment is performed in a subterranean formation at a depth between 4730 and 4780 feet having a reservoir temperature of about 164° F. and a formation permeability of about 300 md. A 90# hydroxyethylcellulose gel is prepared for pumping into the formation. Ten thousand (10,000) gal of gel are pumped as a pad to fracture the formation and 8100 gal of gel are pumped to transport proppant into the formation. The fluid efficiency is determined to be 6.9%.

An offset well is treated in the same zone using 10,000 gal of a crosslinked borate gel using 35# hydroxypropylguar followed by 8100 gal. of 75# hydroxyethylcellulose gel to transport proppant. The fluid efficiency is determined to be 28.5%.

The results clearly demonstrate the effectiveness of the method of the present invention.

While particular preferred embodiments of the present invention have been described, it is to be understood that such descriptions are provided for purposes of illustration only and that the invention is not to be considered as limited thereto or to any suggested modifications and that other reasonable variations and modifications will be apparent to one having skill in the art. It is intended that all such embodiments be included within the scope of the invention as limited only by the appended claims.

What is claimed is:

1. A method of fracturing a subterranean formation having a permeability in excess of about 10 md comprising:

preparing a first aqueous gel by admixing a first gelling agent with an aqueous liquid;

combining a crosslinking agent with said first aqueous gel in an amount sufficient to result in crosslinking of said first aqueous gel;

introducing said first crosslinker containing aqueous gel into said subterranean formation at a rate and pressure sufficient to create at least one fracture in said formation having a permeability in excess of about 10 md and to produce a filter cake on at least a portion of the face of said fracture preparing a second aqueous gel by admixing a second gelling agent with an aqueous fluid whereby a linear gel is formed;

admixing a proppant with at least a portion of said aqueous linear gel;

introducing said proppant containing aqueous linear gel into said subterranean formation behind said first crosslinker containing aqueous gel to increase the rate of fluid leak-off to said formation by disruption of the filter cake on the face of said fracture while extending said created fracture in said formation; and packing proppant into at least a portion of said created fracture by dehydration of the proppant containing gel through increased fluid leak-off over that of the undisrupted filter cake.

2. The method of claim 1 wherein said first gelling agent comprises at least one member selected from the group of guar gum, hydroxypropylguar, carboxymethylhydroxypropylguar and grafted hydroxyethylcellulose.

3. The method of claim 1 wherein said crosslinking agent comprises at least one member selected from the group of a source of borate ions, titanium IV ions, zirconium IV ions, antimony III ions and chromium III ions.

4. The method of claim 1 wherein said crosslinking agent comprises at least one member selected from the group of borate ions, titanium IV ions and zirconium III ions.

5. The method of claim 1 wherein said second gelling agent comprises at least one member selected from the group of hydroxyethylcellulose, hydroxypropylguar and vinyl phosphonic acid grafted hydroxyethylcellulose.

6. The method of claim 1 defined further to include the step of admixing proppant with at least a portion of the first crosslinker containing aqueous gel for introduction into said created fracture.

7. The method of claim 1 wherein at least one of said first crosslinker containing aqueous gel and said second aqueous gel is defined further to include a gas.

8. The method of claim 7 wherein said gas comprises at least one member selected from nitrogen and carbon dioxide.

9. The method of claim 1 wherein said filter cake is disrupted by a change in pH induced by contact with the second aqueous gel.

10. A method of fracturing a subterranean formation having a permeability in excess of about 10 md comprising:

preparing a first aqueous gel by admixing a first gelling agent with an aqueous liquid and a pH control agent;

combing a crosslinking agent with said first aqueous gel in an amount sufficient to result in crosslinking of said first aqueous gel;

introducing said crosslinker containing first aqueous gel into said subterranean formation at a rate and pressure sufficient to create at least one fracture in said formation and to control fluid leak-off from said fracture by formation of a filter cake on the face of at least a portion of said fracture;

preparing a second aqueous gel by mixing a second gelling agent with an aqueous liquid and a pH control agent whereby a linear gel is formed;

introducing said second aqueous gel into said fracture in said formation;

admixing proppant with at least a portion of said second aqueous gel;

disrupting the filter cake on the face of said fracture by contact with said second aqueous gel whereby fluid leak-off through the filter cake is increased; and placing at least a portion of said proppant contained in said second aqueous gel within said fracture.

11. The method of claim 10 wherein said first gelling agent is hydroxypropylguar and the crosslinking agent is a source of borate ions.

12. The method of claim 10 wherein the pH control agent in the first aqueous gel provides a pH in the range of from about 9 to about 11 to said gel during crosslinking of said gel.

13. The method of claim 10 wherein said second gelling agent comprises at least one member selected from the group of hydroxypropylguar and hydroxyethylcellulose.

14. The method of claim 10 wherein the pH control agent in the second aqueous gel provides a pH to the gel in the range of from about 5 to about 7.5.

15. The method of claim 10 wherein at least one of said first aqueous gel and said second aqueous gel includes at least one member selected from the group of nitrogen and carbon dioxide.

16. The method of claim 10 wherein said first aqueous gel includes nitrogen in an amount of from about 5 to about 96% by volume of said fluid.

17. The method of claim 10 wherein said second aqueous gel includes a breaker which assists in the disruption of said filter cake.

18. The method of claim 10 wherein said proppant is present in said second aqueous gel in an amount of from about ¼ to about 30 pounds per gallon of gel.

* * * * *